T. H. KING.
Refrigerator.
No. 4,086.
Patented June 20, 1845.
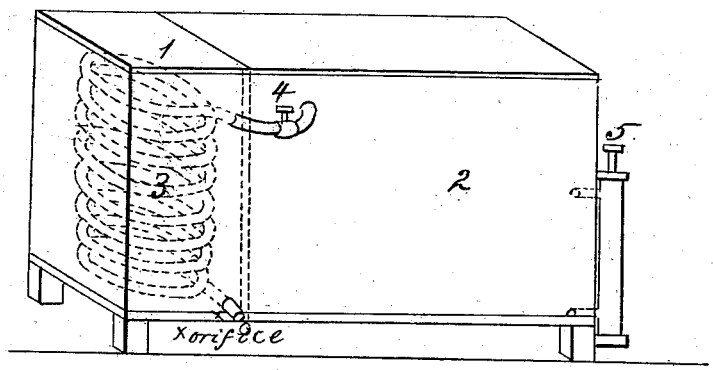
Inventor,
Thomas H King

UNITED STATES PATENT OFFICE.

THOS. H. KING, OF NEW YORK, N. Y.

REFRIGERATOR.

Specification of Letters Patent No. 4,086, dated June 20, 1845.

*To all whom it may concern:*

Be it known that I, THOMAS H. KING, of the city of New York, in the county and State of New York, have invented a new and improved mode of constructing refrigerators or depositories for the preservation of meat, fish, fowl, fruit, vegetables, and other food; and I do hereby declare that the following is a full and exact description of the construction thereof.

I first make a vessel or receiver, either of wood, metal or other suitable material, and of any required form or dimensions; the same having two or more compartments, one of which I will denominate the "ice chamber" (1), the other one or more, the "safe" (2). All the compartments are lined with zinc, lead or any other suitable material, and packed throughout (excepting only the partition which divides the ice chamber from the safe) with the best known non-conductors of heat. The ice chamber contains around the inside, a coil of pipe or tubing (3) some fifty feet or upward in length (according to the size of the vessel) one end of which pipe is passed through and made fast in, the side of the ice chamber; its orifice (6) communicating with the common atmosphere in which the vessel is placed; the other end is passed through and made fast in the safe, and has in it a stop cock (4) to shut off or allow, communication at pleasure. Near to that end of the pipe or tubing which enters the meat safe, is affixed a small vessel or receiver, to catch such water as may be formed by the condensation from the warm air passing through the pipe. In the bottom of the ice chamber, is a valve drainer, or bell-trap to prevent the ingress of air, and yet allow the egress of the water, produced by the melting of the ice, with which the space within the coil of tubing is to be filled. I then close the chamber, with an inner and an outer lid. The other compartments or safe, is fitted with shelves, troughs, hooks, etc., for the reception of whatsoever it may be desired to place therein; this safe I also close, with an inner and an outer lid. To the safe I affix an air-pump, (5) suitable to the size thereof.

I will now suppose the vessel to be wholly or in part filled *i, e*, the ice chamber, with ice, the safe, with food, and the lids all shut close. I then, by means of the stop cock, shut off the communication between the atmosphere and the safe; the food is now closed up in the safe, but with the common atmospheric air, at the same temperature as that in which the vessel stands. I now, by use of the air-pump (the vessel being sufficiently tight therefor) draw off the air from the safe, and having thus formed a considerable vacuum therein as soon as it may be desired. I open the communication by means of the stop cock aforesaid, and admit fresh, dry air, which having passed through the tubing that surrounds the ice in the chamber, will always be at a temperature approaching 32 degrees Fahrenheit, and free from the moisture which would have been generated, had the air come in contact with the ice in the chamber. This cooling of the air may be accomplished by placing a cylinder of zinc or other metal within the chamber, which cylinder being filled with ice, and closed, the air playing around will be held at an equally low temperature, and may in this way be prepared for supplying and ventilating the safe, with fresh, dry air. Moisture in combination with confined air, is the principal cause of the speedy tainting and decomposition of food of every description, by doing away with which, we attain that long sought after, but until now undiscovered (or at least unthought of) desideratum, of perfect ventilation at will; for it must be perceived, that should the air in the receiver or safe, become too warm, or in any way vitiated, it can be instantly displaced and exchanged, for fresh, dry, cold air, and although a thermometer hanging on the outside of the safe, on a summer's day, might stand at above 100 degrees, another hanging withinside, would be down nearly to the freezing point. Thus having the height of summer, and the depth of winter, within three or four inches of each other, and affording an opportunity to keep animal food uncooked, for two or three weeks in the hot season, thus permitting it to become as rich and as mellow (still remaining equally sweet) as it would be in the cold season; instead of, as now, killing the animal one day, throwing the meat on the ice for the night, (to be kept cool to be sure, but as certainly to become sodden) and the next day cooking it, to preserve from decomposition, although in a very unfit state to be served up as food. The superior advantages of this refrigerator for keeping food after it has been dressed, must be fully apparent.

If desirable the dry, cold air, may be introduced through the tubing without first creating a vacuum, by applying a force pump or bellows, to the outer orifice of the pipe, thus forcing air through the tubing at a low temperature, into the safe, which would expel that of a higher temperature contained therein, through a valve or outlet made in the safe for that purpose.

What I claim as my invention, or improvement, and desire to secure by Letters Patent, is—

1. The above described method of preserving food in hot places, seasons or climates, in a fresh, dry, cold air, without the immediate presence of ice, or other cause to produce humidity; and this I claim to do either by creating a partial or almost entire vacuum, or by blowing or pumping in the air, in manner aforesaid; thus fully and effectually causing ventilation, by air at a low temperature, and thereby better preserving from decay, animal, vegetable and other substances, liable to be destroyed by the presence of heat and moisture.

2. I also claim the right to construct, use and vend the same, and to apply the coil of pipe, tubing or cylinder, as also the air-pump, force-pump or bellows, to vessels or any apparatus already made and used, or intended to be made and used, as refrigerators for the preservation of food, &c., in the manner aforesaid.

THOMAS H. KING.

Signed in presence of—
Wm. Z. Greasley,
Will H. King.